C. D. ADAIR.
GASOLENE SEDIMENT TRAP.
APPLICATION FILED MAR. 26, 1915.

1,167,246.

Patented Jan. 4, 1916.

Witnesses

Inventor
C. D. Adair

UNITED STATES PATENT OFFICE.

CLAUDE D. ADAIR, OF SHELLROCK, IOWA.

GASOLENE-SEDIMENT TRAP.

1,167,246.   Specification of Letters Patent.   Patented Jan. 4, 1916.

Application filed March 26, 1915. Serial No. 17,280.

*To all whom it may concern:*

Be it known that I, CLAUDE D. ADAIR, a citizen of the United States, residing at Shellrock, in the county of Butler and State of Iowa, have invented certain new and useful Improvements in Gasolene-Sediment Traps; and I do hereby declare the following to be a full, clear, and exact description of the invention, such as will enable others skilled in the art to which it appertains to make and use the same.

The invention relates to a gasolene sediment trap for gasolene engines.

The object of the present invention is to improve the construction of gasolene strainers and to provide a simple, practical and inexpensive gasolene sediment trap designed to be arranged in the gasolene pipe line between the tank and the carbureter or mixer and adapted to trap water and dirt and thereby eliminate engine trouble caused by the presence of such foreign matter in the gasolene.

A further object of the invention is to provide a gasolene strainer adapted to permit the trap water and sediment to be readily drawn off and capable also of enabling the trap to be readily detached for cleaning the same without disturbing the pipe line.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
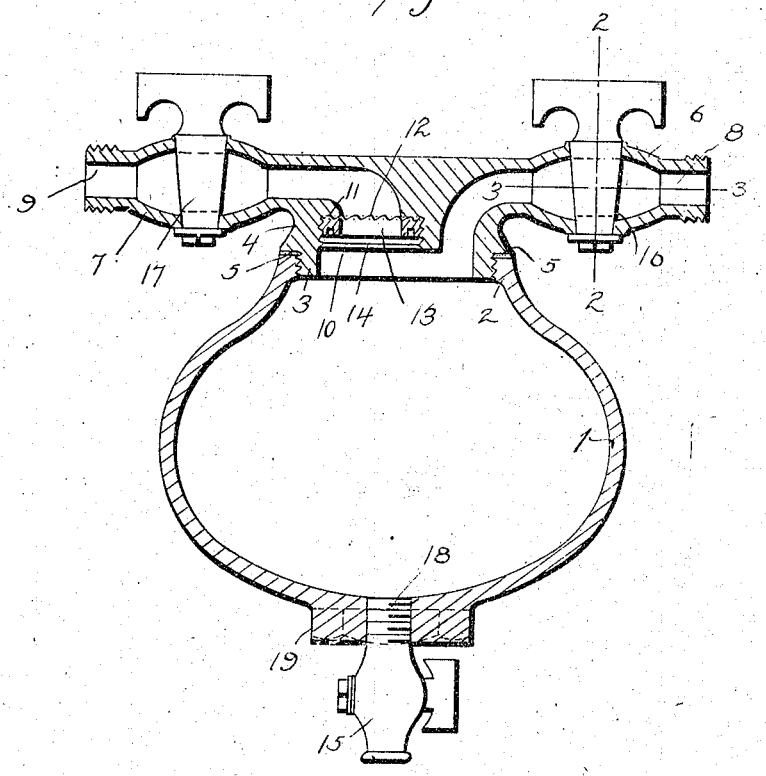
Figure 2:
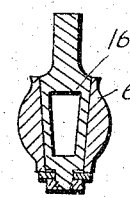
Figure 3:
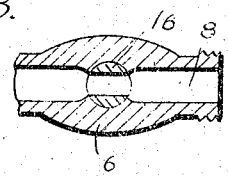

In the drawing Figure 1 is a longitudinal sectional view of a gasolene sediment trap constructed in accordance with this invention, Fig. 2 is a transverse sectional view on the line 2—2 of Fig. 1, Fig. 3 is a horizontal sectional view substantially on the line 3—3 of Fig. 1.

Like numerals of reference designate corresponding parts in the several figures of the drawing.

In the accompanying drawing in which is illustrated a practical embodiment of the invention, 1 designates a receptacle constituting the body portion of the trap and having an open top 2 which is interiorly threaded for the reception of a threaded circular portion 3 of a cap section 4. The cap section which is reduced at the threaded portion to form a shoulder 5 for engaging the upper edge of the receptacle 1 is provided at opposite sides with tubular extensions 6 and 7 having longitudinal passages 8 and 9 and adapted to be connected with the gasolene tank and the carbureter or mixer of a gasolene engine of an automobile or other motor vehicle, or stationary engines. The tubular extensions 7 are exteriorly threaded at their terminals to enable the device to be readily placed in the gasolene pipe line and the passages 8 and 9 extend inwardly and terminate at the interior of the cap section. The cap section is provided at the inner end of the passage 9 with a circular recess 10 forming a shoulder or seat 11 at the top thereof for a strainer 12 which is retained in place by a threaded locking ring 13 which engages the screw threads 14 of the socket 10. The gasolene passing through the pipe line enters the receptacle 1 by the passage 8 and it passes upwardly through the passage 9 to the carbureter or mixer. The strainer 12 which is constructed of fine wire or other suitable material is adapted to cause the dirt or sediment to drop back into the receptacle 1 so that the strainer is left clean and the receptacle in which the water contained in the gasolene collects is provided at the bottom with a drain cock 15 to enable the water to be readily drained off with the sediment when desired. The tubular extensions 6 and 7 are equipped with cut off valves 16 and 17 which are adapted to be closed when the sediment trap is cleaned. The drain cock 15 is provided with a threaded shank portion 18 which is screwed into a threaded opening of an enlarged polygonal wrench receiving portion 19 adapted to permit the receptacle to be readily unscrewed when it is desired to clean the same. The receptacle is adapted to be screwed on and off the threaded portion of the cap section without disturbing the pipe line.

What is claimed is:—

A device of the class described including a trap receptacle, a cap section fitted on the said receptacle and provided with inlet and outlet passages communicating at their inner ends with the said receptacle, said cap section being provided at the inner end of the outlet passage with a recess forming a shoulder or seat and having screw threads, a strainer arranged in the recess against the shoulder or seat and a threaded locking ring engaging the threads of the recess and retaining the strainer in position.

In testimony whereof I affix my signature in presence of two witnesses.

CLAUDE D. ADAIR.

Witnesses:
 CARL MANSFIELD,
 JIM COBERN.